United States Patent

Murphy et al.

[11] Patent Number: 5,022,147
[45] Date of Patent: Jun. 11, 1991

[54] METHOD OF ASSEMBLING A SUCTION STRAINER

[75] Inventors: Paul F. Murphy; Brian M. Marriott, both of York, Pa.

[73] Assignee: Carrier Corporation, Syracuse, N.Y.

[21] Appl. No.: 542,344

[22] Filed: Jun. 22, 1990

Related U.S. Application Data

[62] Division of Ser. No. 321,042, Mar. 9, 1989, Pat. No. 4,946,598.

[51] Int. Cl.$^5$ ............................................. B01D 35/00
[52] U.S. Cl. .......................... 29/890.148; 29/890.14; 210/452
[58] Field of Search ...................... 29/890.14, 890.148, 29/890.149, 428; 210/448, 450, 454, 456, 497.01, 452, 453; 138/41; 285/21.22; 417/902; 418/47, 63

[56] References Cited

U.S. PATENT DOCUMENTS

| | | | |
|---|---|---|---|
| 3,458,050 | 7/1969 | Cooper | 210/448 |
| 3,667,616 | 6/1972 | Wayne | 210/451 |
| 3,970,566 | 7/1976 | Rosaen | 210/452 |
| 4,197,207 | 4/1980 | Rosaen et al. | 210/447 |
| 4,560,329 | 12/1985 | Hirahara et al. | 418/47 |
| 4,678,589 | 7/1987 | Ayres, Jr. | 210/297 |
| 4,818,402 | 4/1989 | Steiner et al. | 210/411 |

*Primary Examiner*—Irene Cuda

[57] ABSTRACT

A suction strainer is provided in which the mesh portion is spaced from the outlet so as to provide a large area of the mesh portion with the same pressure drop. Additionally, the entrance to the outlet branch is provided with a generous radius for a smoother flow transition.

3 Claims, 2 Drawing Sheets

METHOD OF ASSEMBLING A SUCTION STRAINER

This application is a division of application Ser. No. 321,042, filed Mar. 9, 1989, now U.S. Pat. No. 4,946,598.

BACKGROUND OF THE INVENTION

A compressor can be protected from particulate matter and debris by locating a suction strainer upstream of the inlet of the compressor. Ordinarily, the basket of the strainer is corrugated to increase the surface area exposed to the flow and the flow is directed into the basket of the strainer such that the flow changes direction in passing through the screen or the like defining the basket. Ideally, the entire surface of the basket defines the flow path. In a typical configuration, a generally cylindrical strainer is located in the crossarm of a tee-shaped housing which is closed at one end. As a result, the flow axially entering the strainer from the crossarm passes radially through the strainer into the annular space between the basket and crossarm bore, and then into the perpendicular branch of the tee from which it enters the compressor. The "shortest distance" flow path would have the flow passing through the strainer in the region closest to the perpendicular branch and over an area roughly corresponding to the area of the entrance to the perpendicular branch. The efficient operation of the strainer requires the use of as much of the surface area of the basket as possible so a portion of the flow is required to take a longer flow path. Normally the strainer is spaced from the surrounding tee for most of its area. It has been found that high fluid velocities generated in the annular space between the strainer and the crossarm bore induce differential pressure distribution in the region between the strainer and the adjacent wall of the crossarm bore. This tends to draw the strainer to the outlet so that the strainer and tee coact in the region of the outlet to restrict and/or block flow between the space defined between the strainer and the wall of the surrounding crossarm bore and the outlet. This differential pressure is further exacerbated by any sharp transitions which may exist between the crossarm and the perpendicular branch which both reduces the entrance area of the outlet and creates an impedance to smooth fluid flow. These differential pressures and high velocities result in energy losses which impede system performance (or capacity) and impose increased operating costs.

SUMMARY OF THE INVENTION

A suction strainer is located in the crossarm portion of a seamless tee-weld fitting or tee and is held in a spaced relationship with the bore of the crossarm. This results in a generally uniform annular clearance between the basket of the suction strainer and the bore of the crossarm. Preferably, the strainer basket converges in a downstream direction at an angle of approximately 5° which further increases the annular clearance. The entrance to the perpendicular branch is provided with a generous radius which provides both a large entrance flow area and a smoother flow transition.

It is an object of this invention to provide a suction strainer with reduced pressure/energy losses.

It is another object of this invention to provide a suction strainer having a more uniform flow profile.

It is an additional object of this invention to minimize the differences in flow path resistance for flow paths through most or all of the strainer.

It is another object of this invention to provide a method for assembling a suction strainer with reduced pressure/energy losses.

It is a further object of this invention to provide a suction strainer capable of trapping particulate matter and debris while providing a minimal pressure/energy loss. These objects, and others as will become apparent hereinafter, are accomplished by the present invention.

Basically, a strainer is located in the crossarm of a tee with one end of the crossarm defining an inlet and the other end being closed. A flange is welded at each end of the crossarm and the end of the perpendicular branch of the tee. An inlet ring, which serves as a welding ring during assembly, is located in the inlet end of the crossarm and coacts with the strainer basket to properly position the strainer with respect to the crossarm bore while directing the flow into the interior of the strainer basket. The strainer is sized to have an external surface area 6–10 times the exit pipe area. The strainer is located in spaced relationship within the crossarm bore such that there exists a gap of 0.15 to 0.25 times the pipe diameter of the perpendicular branch. The well rounded entrance to the perpendicular branch defining the exit has a minimum inner surface profile or rounding radius of at least 0.1 times the exit pipe diameter, preferably 0.2 to 0.5 times. Because the strainer is located in a spaced relationship with the surrounding crossarm, the entire available area of the strainer basket can be used as the flow path. As a result, the flow through the strainer basket has a very low pressure loss. The flow passing through the strainer basket into the surrounding crossarm annular space flows into the perpendicular branch via a well rounded branch entrance profile. In the preferred embodiment, the strainer basket converges in a downstream direction which causes the annular space to diverge in the downstream direction and to space the strainer basket a greater distance from the well rounded entrance to the perpendicular branch.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
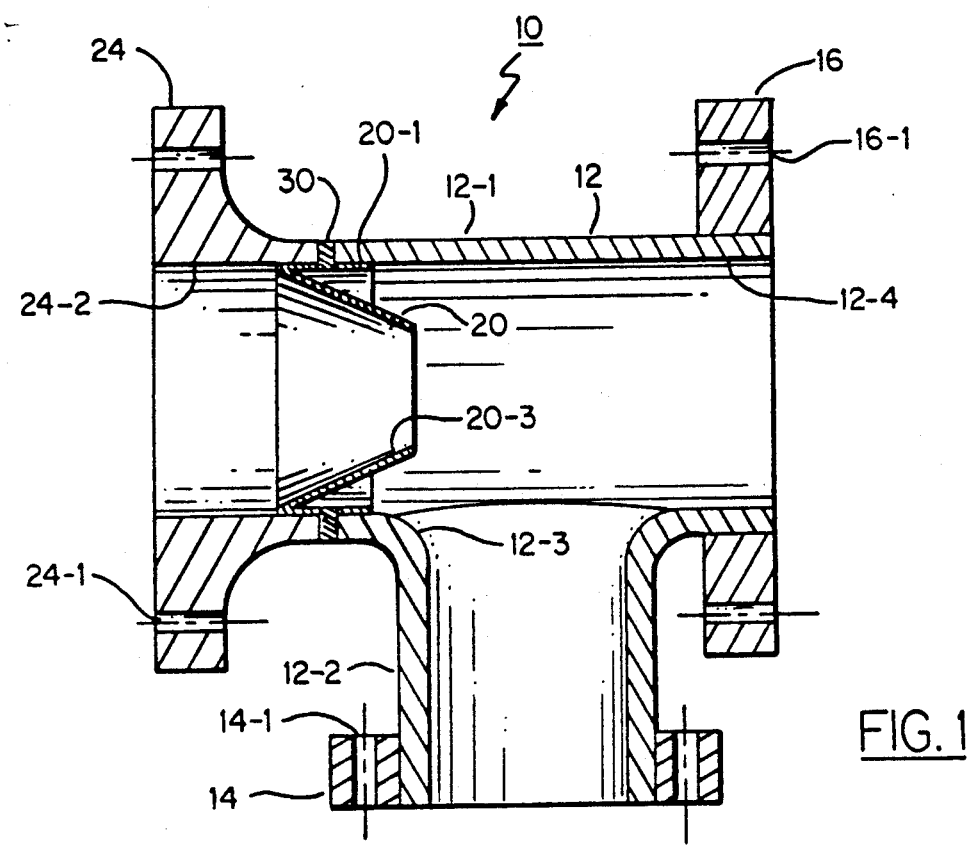
FIG. 1 is a sectional view of the housing for the suction strainer.
Figure 2:
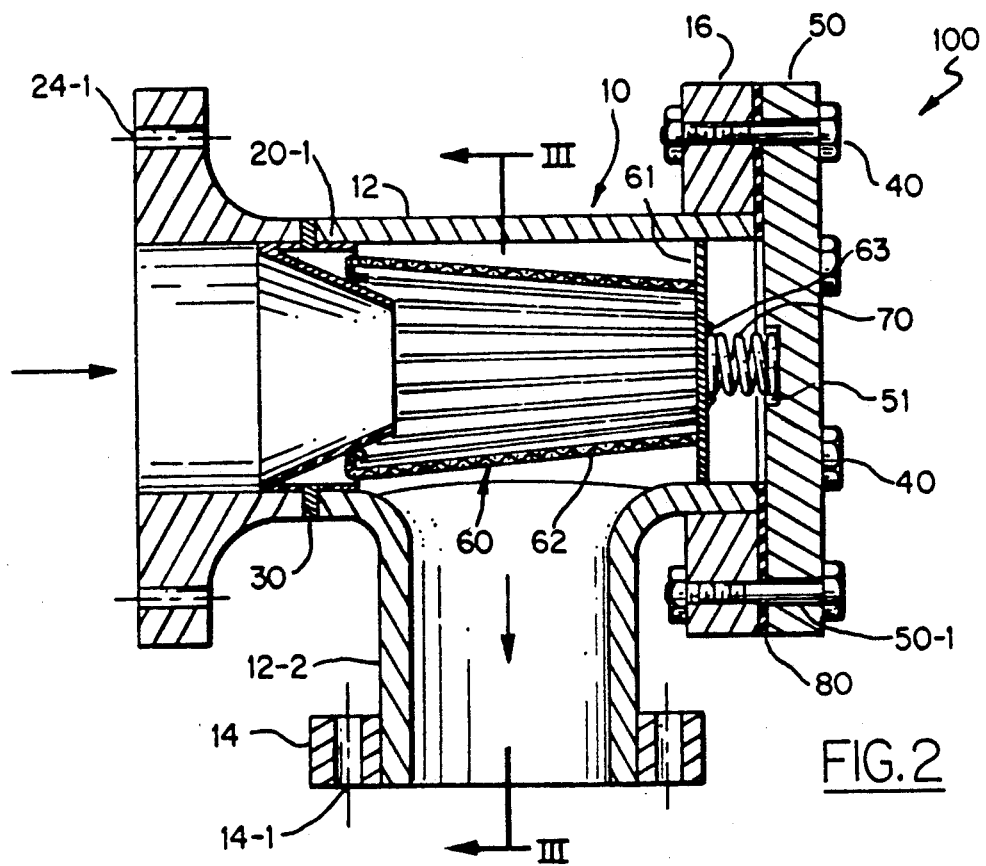
FIG. 2 is a sectional view corresponding to FIG. 1 and showing the assembled suction strainer assembly.
Figure 3:
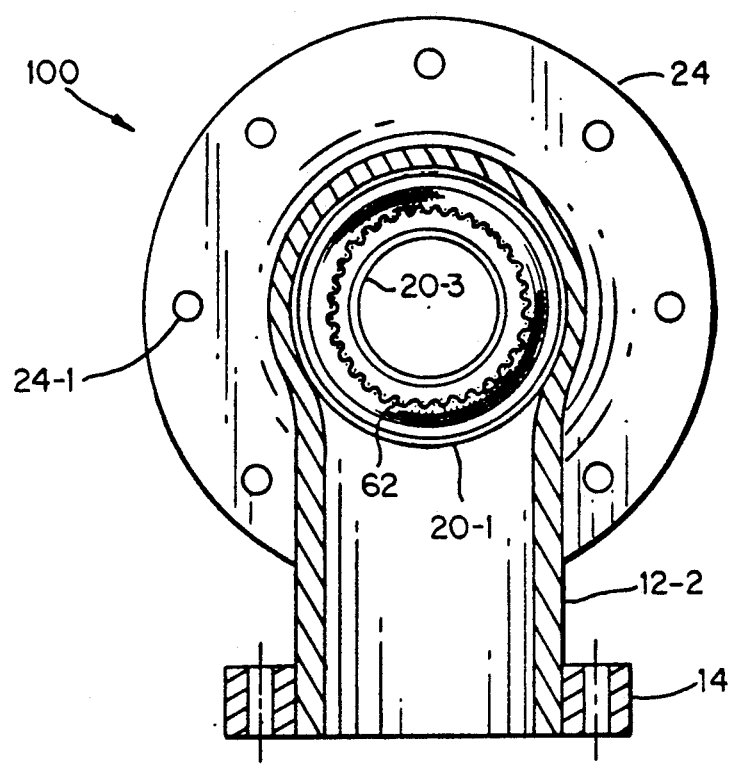
FIG. 3 is a sectional view taken along line III—III of FIG. 2.

In the Figures, the numeral 10 generally designates the housing of suction strainer assembly and the numeral 100 indicates the assembled suction strainer assembly. Suction strainer assembly housing 10 includes a tee 12 defining a seamless tee-weld fitting and having a crossarm 12-1 and a perpendicular branch 12-2 connected through a well rounded section 12-3 defining the entrance to the perpendicular branch 12-2 from crossarm 12-1. Flanges 14 and 16 are welded to the end of the perpendicular branch 12-2 and one end of crossarm 12-1, respectively. The numeral 20 generally designates an inlet ring which also functions as a welding ring. Inlet ring 20 has an outer, cylindrical portion 20-1 sized to snugly fit in the bore 12-4 of crossarm 12-1 and the bore 24-2 of flange 24. At the same axial location and at 90° spacings on the cylindrical portion 20-1 of inlet ring 20 are, nominally, 0.125 inch by 0.125 inch radial protrusions 20-2. Inlet ring 20 has an inner, frustoconical portion 20-3 which is effectively folded back with respect to cylindrical portion 20-1 so as to make an angle of approximately 20°–30° therewith.

Figure 4:
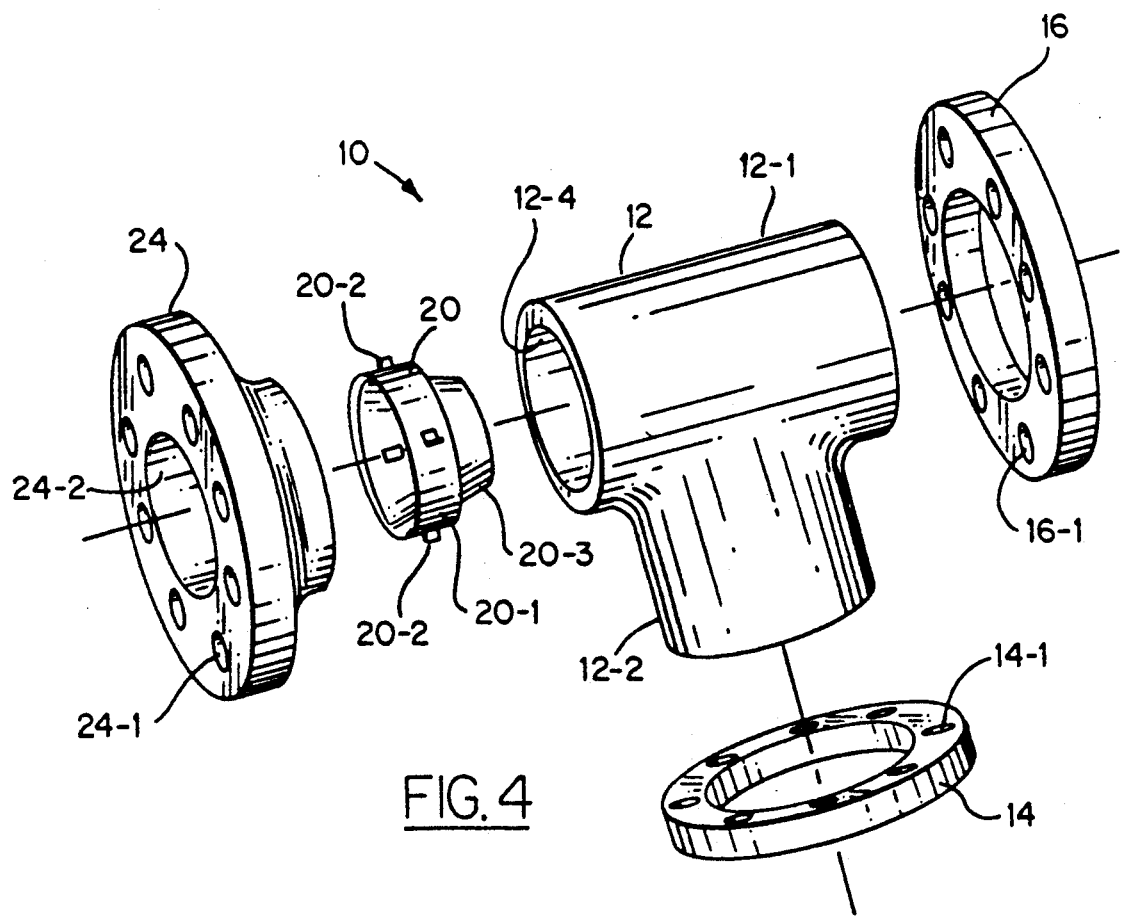
FIG. 4 is an exploded view of the structure of FIG. 1.

Inlet ring 20, during assembly of suction strainer 10, serves as a welding ring. Referring specifically to FIGS. 1 and 4, inlet ring 20 is inserted into the bore 12-4 to the extent permitted by protrusions 20-2 such that the smallest diameter portion of frustoconical portion 20-3 is within bore 12-4. Inlet flange 24, which is in the form of a weld neck flange is placed over inlet ring 20 to the extent permitted by protrusions 20-2 such that inlet flange 24 and crossarm 12-1 act as sleeves with respect to inlet ring 20 and are separated by protrusions 20-2. This coaction properly locates and aligns flange 24, inlet ring 20 and tee 12 so that the spacing created by protrusions 20-2 provides the situs of full penetration weld 30. Flange 14 is placed over and welded to the end of perpendicular branch 12-2 and is provided with a plurality of circumferentially located holes 14-1 for receiving bolts (not illustrated) for bolting suction strainer assembly housing 10 to the inlet of a compressor or pump (not illustrated). Flange 24 is provided with a plurality of circumferentially located holes 24-1 for receiving bolts (not illustrated) for bolting suction strainer assembly housing 10 to an inlet fluid connection such as that of the evaporator (not illustrated) of a refrigeration system. Flange 16 is placed over the end of crossarm 12-1 opposite from flange 24 and is welded thereto and is provided with a plurality of circumferentially located clearance holes 16-1 for receiving bolts 40 for removably securing blind flange or plate 50 to flange 16 in a fluid tight manner.

With flanges 14, 16 and 24 welded to tee 12, as illustrated in FIG. 1 and described above, and with plate 50 removed, a strainer basket 60 can be inserted into bore 12-4 such that it seats on the outer surface of frustoconical portion 20-3 or, if present, can be removed and replaced. Strainer basket 60 includes end plate 61 and wire mesh portion 62. Wire mesh portion 62 is multi-layered, corrugated or pleated and is of a frustoconical configuration with a taper of, nominally, 5° as compared to the 20°–30° taper of frustoconical portion 20-3 on which it seats. Integral, solid end plate 61, which is located at the narrowest end of basket 60, serves to center strainer basket 60 by coacting with bore 12-4 and directs the flow entering basket 60 through the mesh 62. A centrally located annular projection 63 is provided on the end plate 61 on the opposite side from mesh 62 and receives one end of spring 70 for which it provides a seat. If desired, spring 70 can be secured to end plate 61 so as to be integral therewith. Preferably, a gasket 80 is located between flange 16 and plate 50 to insure a fluid tight seal. Plate 50 has a centrally located recess 51 for receiving the other end of spring 70 and a plurality of circumferentially located holes 50-1 corresponding to holes 16-1. When bolts 40 are inserted through holes 50-1 and threaded into bores 16-1 of flange 16 or secured by nuts, the strainer basket 60 is held biased onto frustoconical portion 20-3 by biasing means spring 70.

In operation, fluid is drawn into suction strainer assembly 100 via bore 24-2 in flange 24 and passes through the converging flow path defined by frustoconical portion 20-3 and into strainer basket 60. Because the converging of the flow path represents an energy loss in the region of frustoconical portion 20-3 which reduces its availabile flow path cross section, the convergence is preferably held to, nominally, one half of an inch radially. Also, the axial overlap of basket 60 and frustoconical portion 20-3 is preferably held to, nominally, a quarter of an inch. The flow entering strainer basket 60 must pass through mesh 62 since spring 70 keeps strainer basket 60 seated on frustoconical portion 20-3 and because end plate 61 is solid. The selected geometries of frustoconical portion 20-3 and of the basket support ring formed at the open end of mesh 62 will conform precisely to each other up to several degrees of misalignment. Elasticity of frustoconical portion 20-3 will enhance conformity with the basket support ring and further improve joint characteristics. Due to the combination of the smooth inlet transition provided by frustoconical portion 20-3, the axial centering effect of end plate 61, the taper of mesh 62, the well rounded entrance 12-3 to perpendicular branch 12-2, and a relatively large annular space surrounding mesh 62, a relatively unrestricted and continuous flow path is created. These features eliminate any significant pressure differential across the mesh 62 and promote a relatively even velocity profile through the assembly 100. As a result, pressure/energy losses produced by this strainer assembly are minimized.

Although a preferred embodiment of the present invention has been illustrated and described, other changes will occur to those skilled in the art. For example, the strainer basket 60 may be eccentrically located in bore 12-4 by moving it further away from rounded section 12-3. This would permit the use of a cylindrical mesh member to get a greater surface area while reducing the pressure drop by the increased area between the mesh and the outlet. On large strainers, a biasing means that utilizes a slide spring instead of a compression spring can be used, which provides the user with handles for easier installtion. The present invention can be used with other fluid moving devices such as blowers and pumps as well as a variety of fluids in addition to the common refrigerants. It is therefore intended that the present invention is to be limited only by the scope of the appended claims.

What is claimed is:

1. A method of assembling a suction strainer assembly comprising the steps of:
   on a tee having a crossarm with a first and second end and a bore therein and a perpendicular branch with a first and a second end and a bore therein which forms an intersection with said crossarm bore at said second end of said perpendicular branch, welding an attachment means to said second end of said crossarm and an attachment means to said first end of said perpendicular branch;
   placing a seat means having an outer cylindrical portion with radial projections and having a first and second end and an inner frustoconical portion integral with said first end of said cylindrical portion and defining a converging flow path in the direction of said second end of said cylindrical portion into said first end of said crossarm bore such that said second end of said cylindrical portion is within said crossarm bore to the extent permitted by said radial projections;

placing an attachment means over said first end of said cylindrical portion to the extent permitted by said projections whereby said attachment means placed over said first end of said cylindrical portion and said first end of said crossarm are separated by a space defined by said projections;

welding said attachment means placed over said first end of said cylindrical portion, said cylindrical portion and said first end of said tee together at the locus of said space defined by said projections.

2. The method of claim 1 further including the steps of:

placing a strainer means into said crossarm bore from said second end of said crossarm bore such that said strainer seats on said seat means and is held spaced from said crossarm bore; and sealing said second end of said crossarm bore.

3. The method of claim 1 further including the step of:

placing a strainer means into said crossarm bore from said second end of said crossarm bore such that said strainer seats on said seat means and is held spaced from said crossarm bore;

biasing said strainer means on said seat; and sealing said second end of said crossarm bore.

* * * * *